United States Patent
Jo et al.

(10) Patent No.: US 8,737,274 B2
(45) Date of Patent: May 27, 2014

(54) SCHEDULING METHOD, MS APPARATUS USING THE SCHEDULING METHOD, DATA TRANSMISSION METHOD, AND BS APPARATUS USING THE DATA TRANSMISSION METHOD IN WIRELESS COMMUNICATION SYSTEM

(75) Inventors: Jun Ho Jo, Anyang-Si (KR); Sung-Guk Yoon, Seongnam-Si (KR); Sae Woong Bahk, Seoul (KR); Jin Ghoo Choi, Columbus, OH (US); Jeong Kyun Yun, Anyang-Si (KR); Seo Woo Jang, Seoul (KR)

(73) Assignees: LG Electronics Inc., Seoul (KR); SNU R&DB Foundation, Seoul (KR)

( * ) Notice: Subject to any disclaimer, the term of this patent is extended or adjusted under 35 U.S.C. 154(b) by 1132 days.

(21) Appl. No.: 12/556,361

(22) Filed: Sep. 9, 2009

(65) Prior Publication Data

US 2011/0058504 A1    Mar. 10, 2011

(51) Int. Cl.
*H04J 3/00* (2006.01)
*H04J 1/00* (2006.01)

(52) U.S. Cl.
USPC .......................................................... 370/280

(58) Field of Classification Search
USPC ......... 370/276, 277, 280, 310, 328, 329, 331, 370/335–337
See application file for complete search history.

(56) References Cited

U.S. PATENT DOCUMENTS

| | | | | |
|---|---|---|---|---|
| 6,236,646 B1 * | 5/2001 | Beming et al. | | 370/335 |
| 7,110,781 B1 * | 9/2006 | Hulbert et al. | | 455/502 |
| 7,852,821 B2 * | 12/2010 | Hyon et al. | | 370/341 |
| 8,059,616 B1 * | 11/2011 | Marchiraju et al. | | 370/335 |
| 2002/0061000 A1 * | 5/2002 | Kakura | | 370/337 |
| 2006/0092881 A1 * | 5/2006 | Laroia et al. | | 370/331 |
| 2008/0137608 A1 * | 6/2008 | Bu et al. | | 370/331 |
| 2009/0103501 A1 * | 4/2009 | Farrag et al. | | 370/337 |

* cited by examiner

*Primary Examiner* — Chi Pham
*Assistant Examiner* — Robert Lopata
(74) *Attorney, Agent, or Firm* — Birch, Stewart, Kolasch & Birch, LLP (57) ABSTRACT

In the MS apparatus for performing scheduling, a reception module receives any number information through a specific downlink channel in a first time unit from each of neighbor BSs. A scheduling module determines, among the neighbor BSs, a BS which is to transmit and receive data using a downlink data transmission region and an uplink data reception region, respectively, in a second time unit according to a previously set rule based on the number information. A transmission module transmits a signal, indicating that data transmission and reception using the downlink transmission region and uplink data reception region, respectively, in the second time unit are not possible, to the other neighbor BSs excluding the determined BS among the neighbor BSs.

14 Claims, 9 Drawing Sheets

SCHEDULING METHOD, MS APPARATUS USING THE SCHEDULING METHOD, DATA TRANSMISSION METHOD, AND BS APPARATUS USING THE DATA TRANSMISSION METHOD IN WIRELESS COMMUNICATION SYSTEM

BACKGROUND OF THE INVENTION

1. Field of the Invention

The present invention relates to a scheduling method, an MS apparatus using the scheduling method, a data transmission method, and a BS apparatus using the data transmission method in a wireless communication system.

2. Discussion of the Related Art

A femtocell base station (BS) refers to a BS type which may be installed in a shadow area not covered by a macrocell BS. The femtocell BS is a miniature version of the macrocell BS and may perform most of a function of the macrocell BS. The femtocell BS includes an independently operating network construction and much more femtocell BSs than relay BSs will be installed in downtowns or in indoor spaces. Therefore, a list of femtocell BSs is not included in a list of neighbor BSs transmitted by a BS to a mobile station (MS) because there is much information about the femtocell BSs.

Figure 1:
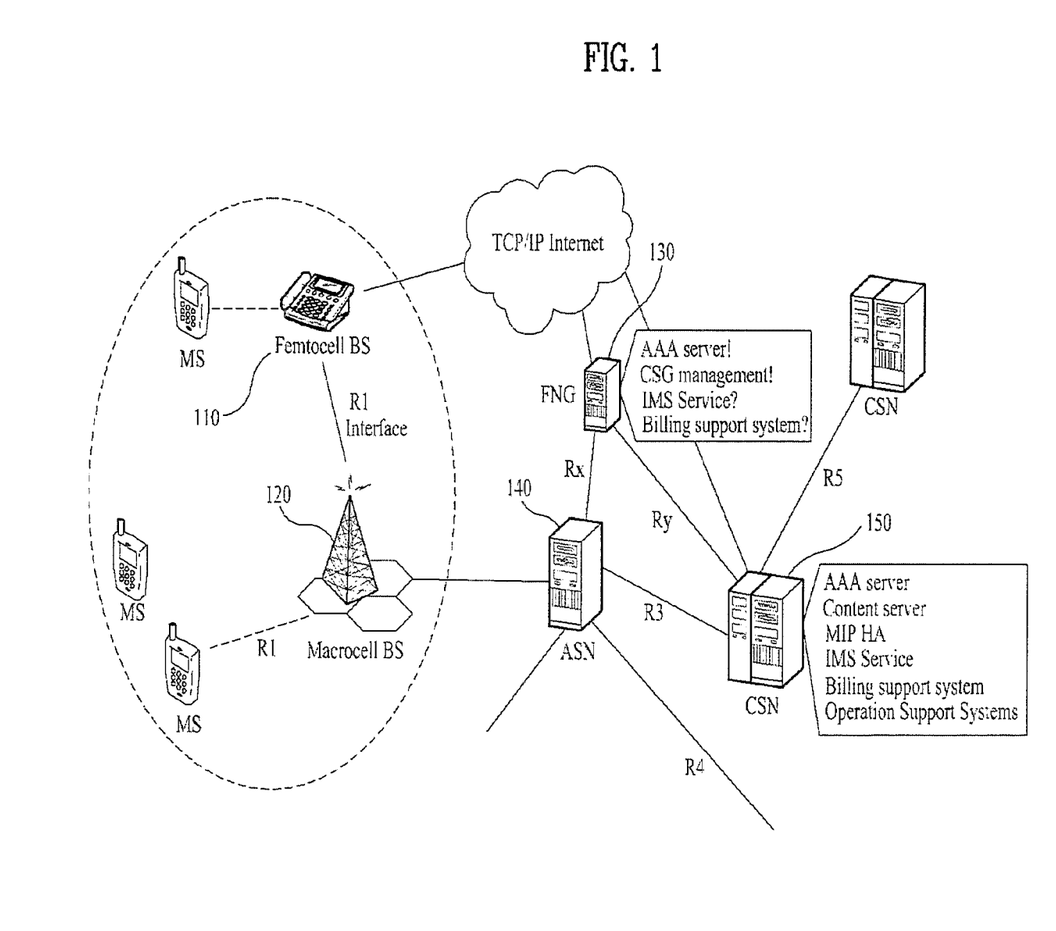
FIG. 1 illustrates a configuration of a wireless communication system to which a femtocell BS is added.

FIG. 1 illustrates the configuration of a wireless communication system to which a femtocell BS is added.

As illustrated in FIG. 1, a wireless communication system to which a femtocell BS is added includes a femtocell BS 110, a macrocell BS 120, a femto network gateway (FNG) 130, an access service network (ASN) 140, and a connectivity service network (CSN) 150. The macrocell BS 120 refers to a general BS of a conventional wireless communication system.

The femtocell BS 110 is a miniature version of the macrocell BS 120 and may perform most functions of the macrocell BS 120. The femtocell BS 110 is directly connected to a transmission control protocol/Internet protocol (TCP/IP) network and independently operates like the macrocell BS 120.

The femtocell BS 110 has coverage of about 0.1 to 30 m and one femtocell BS may accommodate 10 to 20 MSs. The femtocell BS 110 may use the same frequency as the macrocell BS 120 or use different frequencies from the macrocell BS 120.

The femtocell BS 110 is connected to the macrocell BS 120 through an R1 interface to receive a downlink channel of the macrocell BS 120 and to transmit a control signal to the macrocell BS 120.

The femtocell BS 110 may cover an indoor space or a shadow area not covered by the macrocell BS 120 and may support a high data transmission rate. The femtocell BS 110 may be installed in an overlay form within a macrocell or in a non-overlay form in an area uncovered by the macrocell BS 120.

The femtocell BS 110 is classified into two types: a closed subscriber group (CSG) femtocell BS and an open subscriber group (OSG) femtocell BS. The CSG femtocell BS groups MSs which can access the CSG femtocell BS and assigns a CSG identification (ID) to the groped MSs. Only the MSs to which the CSG ID is assigned can access the femtocell BS. The OSG femtocell BS refers to a BS that all MSs can access.

The FNG 130 is a gateway for controlling the femtocell BS 110 and is connected to the ASN 140 and the CSN 150 through an Rx interface and an Ry interface, respectively. The femtocell BS 110 may be served by the CSN 150 through the FNG 130. A service for authentication and IP multimedia subsystem (IMS) functions may be provided by the CSN 150 to MSs connected to the femtocell BS 110. The CSN 150 provides connections of application services such as Internet or voice over Internet protocol (VoIP) to MSs. The ASN 140 controls the macrocell BS 120 and manages connections of the macrocell BS 120 and the CSN 150.

As described above, in the wireless communication system in which the femtocell BS is added, a distance between an MS and a BS is short and hence a signal-to-interference plus noise ratio (SINR) is increased, thereby improving communication performance. However, since BSs are densely distributed, significant interference between the BSs may occur.

To reduce the interference between BSs, BSs of a conventional wireless communication system use frequency resources, electric power resources, code resources, etc. In an interference control method using the frequency resources, different frequencies are allocated to neighbor BSs so that the BSs are not physically affected by the interference. In an interference control method using the electric power resources, BSs are not allowed to use an electric power above a prescribed level, thereby preventing severe interference between BSs or between MSs from occurring. In an interference control method using the code resources, different codes or quasi-orthogonal codes are allocated to BSs and the respective BSs transmit signals by multiplying the allocated unique codes, thereby reducing interference.

In the aforementioned three methods, the interference control method using the frequency resources may be divided into a method for completely discriminately allocating frequencies to BSs, and a method for partially overlapping allocation of frequencies to BSs, in which a user in a cell edge can use a discriminated frequency. An interference control method in a combination of the methods using the frequency resources, power resources, and code resources instead of using an individual method is also widely used.

A recent wireless communication system has developed a tendency to ensure high transmission rate and service quality for multimedia support in addition to a voice call. To ensure such high transmission rate and service quality, it is important to introduce recent physical layer and medium access control (MAC) techniques and to improve an SINR which is a basis of wireless communication. The most basic method for improving SINR is to shorten a distance between an MS and a BS. Namely, a large number of BSs should be densely distributed in order to improve SINR. Recently, many users install a wireless local area network (LAN) BS in their households. This indicates a tendency to improve communication performance by increasing SINR. A femto access point (FAP) called a miniature type BS is a BS, the size of which is reduced to a level of a size of a wireless LAN and the cost of which is lowered. With the emergence of such a FAP, future wireless communication systems are expected to have more densely distributed BSs.

A conventional interference control method has performed a function for allocating unique frequencies or code resources to BSs so that a central controller can reduce interference between neighbor BSs. When considering current circumstances in which wireless communication systems are rapidly developed, a future wireless communication system will have lots of BSs which are densely distributed. Although such a central method has an advantage of effectively eliminating interference between BSs, it also has a disadvantage in terms of scalability.

In circumstances in which computing power is insufficient as in the FAP and a plurality of FAPs or radio LAN BSs are distributed without any planning by a communication enterpriser, the conventional central method demands a large amount of calculation performed by BSs and therefore effective interference control is difficult.

Furthermore, unlike a wireless LAN which is intended to consider distribution without any planning, the FAP will operate in a cellular network system assuming cooperation, thereby causing more interference problems. Since the capacity of a future femtocell BS may be increased to accommodate 10 or more MSs, a new scheduling method, a new frame structure, etc. are required, which can reduce interference between BSs and can improve communication performance.

SUMMARY OF THE INVENTION

Accordingly, the present invention is directed to a scheduling method, an MS apparatus using the scheduling method, a data transmission method, and a BS apparatus using the data transmission method in a wireless communication system, that substantially obviate one or more problems due to limitations and disadvantages of the related art.

An object of the present invention is to provide a scheduling method in a wireless communication system.

Another object of the present invention is to provide an MS apparatus performing scheduling in a wireless communication system.

Another object of the present invention is to provide a data transmission method in a wireless communication system.

A further object of the present invention is to provide a BS apparatus transmitting data in a wireless communication system.

Objects of the invention are not limited to the above-described objects and other objects which are not descried herein will become apparent to any person of ordinary skill in the art from the following description.

To achieve these objects and other advantages and in accordance with the purpose of the invention, as embodied and broadly described herein, a method for scheduling, at a mobile station (MS), data transmission and reception of neighbor base stations (BSs) adjacent to the MS in a wireless communication system, includes receiving number information through a specific downlink channel in a first time unit from each of the neighbor BSs, determining, among the neighbor BSs, a BS which is to transmit and receive data in a second time unit, according to a predefined rule based on the number information, and transmitting a signal, indicating that data transmission and reception in the second time unit are not possible, to the other neighbor BSs excluding the determined BS among the neighbor BSs.

In another aspect of the present invention, an MS apparatus for scheduling data transmission and reception of neighbor BSs in a wireless communication system, includes a reception module for receiving number information through a specific downlink channel in a first time unit from each of the neighbor BSs, a scheduling module for determining, among the neighbor BSs, a BS which is to transmit and receive data in a second time unit according to a predefined rule based on the number information, and a transmission module for transmitting a signal, indicating that data transmission and reception in the second time unit are not possible, to the other neighbor BSs excluding the determined BS among the neighbor BSs.

In a further aspect of the present invention, a method for transmitting data, at a base station (BS), in a wireless communication system, includes transmitting number information to an MS through a specific downlink channel in a first time unit, and if a signal, indicating that data transmission and reception in a second time unit are not possible, is not received, transmitting data in the second time unit.

In another aspect of the present invention, a BS apparatus for transmitting data in a wireless communication system, includes a first transmission module for transmitting number information to an MS through a specific downlink channel in a first time unit; a reception module for receiving, from the MS, a signal indicating that data transmission in a second time unit is not possible, and a second transmission module for transmitting data in the second time unit, when a signal, indicating that data transmission and reception in the second time unit are not possible, is not received from the reception module.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a mobile communication system is a 3GPP LTE system. However, the description is applicable to any other mobile communication systems except for specific features of the 3GPP LTE system.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, 'mobile station (MS)' is assumed to refer to a mobile or fixed user end device such as a user equipment (UE), and 'base station (BS)' is assumed to refer to any node of a network end, such as a node B and an eNode B, communicating with the MS. Also, femtocell BS may be referred to femtocell access point (FAP).

In a mobile communication system, an MS may receive information from a BS through a downlink and the MS may transmit information to the BS through an uplink. Information transmitted or received by the MS includes data and control information. There are various physical channels according to types and purposes of information transmitted or received by the MS.

Figure 2:
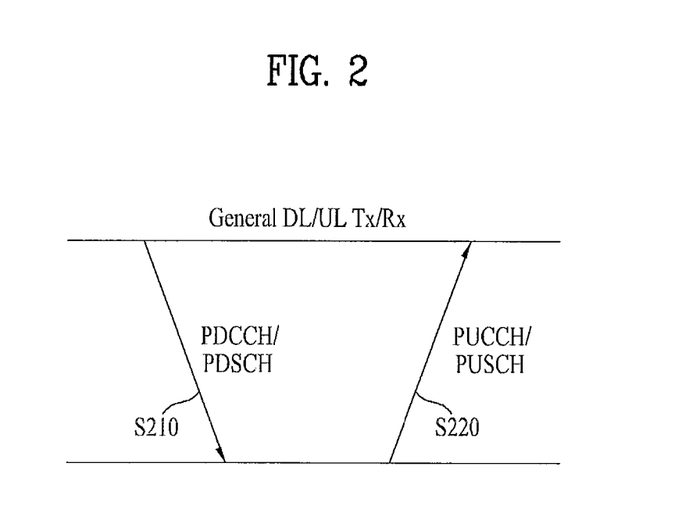
FIG. 2 illustrates general downlink (DL)/uplink (UL) transmission (Tx)/reception (Rx) used in a $3^{rd}$ generation partnership project (3GPP) long term evolution (LTE) system which is an example of a mobile communication system.

FIG. 2 illustrates general downlink (DL)/uplink (UL) transmission (Tx)/reception (Rx) used in a $3^{rd}$ generation partnership project (3GPP) long term evolution (LTE) system which is an example of a mobile communication system.

Referring to FIG. 2, a BS transmits a signal through a physical downlink control channel (PDCCH)/physical downlink shared channel (PDSCH) in step S210, as a general UL/DL signal transmission procedure. An MS transmits a signal through a physical uplink control channel (PUCCH)/physical uplink shared channel (PUSCH) in step S220. Here, control information, which is transmitted to the BS by the MS through a UL or is received by the MS from the BS through a DL, includes a DL/UL acknowledgement/negative acknowledgement (ACK/NACK) signal, a channel quality indicator (CQI), a precoding matrix index (PMI), a rank indicator (RI), etc. In the 3GPP LTE system, the MS may transmit the control information such as the above-described CQI/PMI/RI through the PUCCH/PUSCH.

Figure 3:
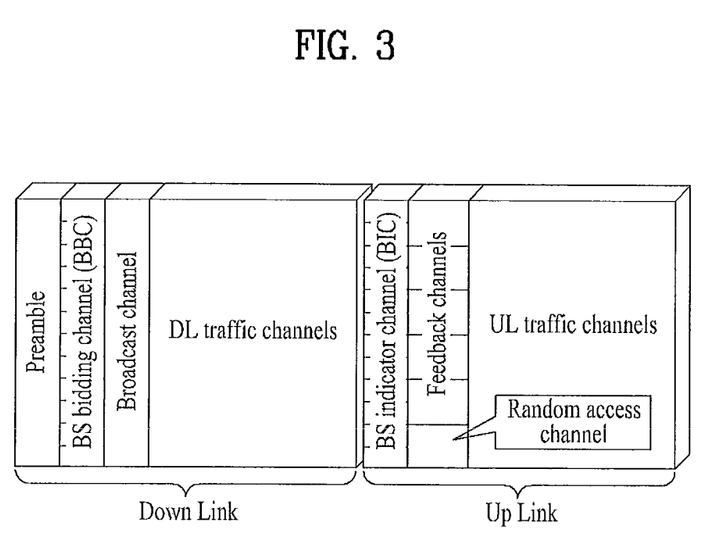
FIG. 3 illustrates a frame structure for supporting a contention-based distributed BS time scheduling scheme according to an exemplary embodiment of the present invention.

FIG. 3 illustrates a frame structure for supporting a contention-based distributed BS time scheduling scheme according to an exemplary embodiment of the present invention.

To aid understanding of the present invention, a time division duplex (TDD)-based frame structure in which an orthogonal frequency division multiple access (OFDMA) scheme is used is illustrated in FIG. 3. However, a code division multiple access (CDMA) scheme different from the OFDMA scheme may also be applied to the frame structure of FIG. 3. Alternatively, frequency division duplex (FDD) different from the TDD may be applied to the frame structure of FIG. 3.

Referring to FIG. 3, neighbor BSs contend with one another on a prescribed time unit basis. The time unit may be one of one subframe, one slot, two or more subframes, and two or more slots. The frame structure illustrated in FIG. 3 is proposed to describe a contention scheme in units of one subframe as an example of the time unit. Hereinafter, the contention scheme on a subframe basis will be described.

One subframe may include a DL region and a UL region. The DL region may include a preamble used for channel estimation, a broadcast channel for broadcasting control information to an MS, DL traffic channels for transmitting signals or data, and a BS bidding channel (BBC). The preamble region may correspond to a synchronous channel region in an LTE system. The BBC may be positioned as an additional channel different from a PDCCH of the LTE system or may be positioned within the PDCCH or a PDSCH.

The UL region may include a BS indicator channel (BIC), a feedback channel, a random access channel, and UL traffic channels. The BIC may be positioned as an additional channel different from a PUCCH or may be positioned within the PUCCH or a PUSCH in the LTE system.

A pair of BBC/BIC is used for contention between neighbor BSs. The locations of the BBC in the DL region and the BIC in the UL region shown in FIG. 3 are purely exemplary and the locations thereof may be changed. The BBC and BIC are examples of names of channels acquired by a BS in the DL region and the UL region. The BBC and BIC may be called other names and are not limited to such names.

The BBC and BIC may be comprised of a plurality of subchannels. Each BBC subchannel has each corresponding BIC subchannel. In the present invention, a BBC subchannel, and a BIC subchannel corresponding to the BBC subchannel are referred to as a pair of BBC/BIC. The BBC is a DL channel and the BIC is a UL channel.

Each BS needs to acquire the BBC and the BIC in the DL region and the UL region respectively, to have a transmission opportunity. Namely, it is necessary to acquire the BBC in the DL region and the BIC in the UL region. A process for acquiring the transmission opportunity at a BS will now be described.

Each BS may collect information about the BBC/BIC for a prescribed time period in order to obtain a pair of BBC/BIC. That is, the BS may collect a list of pairs of unused BBCs/BICs for a prescribed time period. To obtain the list of the pairs of unused BBCs/BICs, the BS may previously include a busy channel table. The table may include information about a recently used time of each BIC. If a channel at a predefined time is an idle state, the channel may be considered to be an idle state. If the BS does not acquire a pair of BBC/BIC, the BS may randomly select one pair of idle BBC/BIC from the list for idle channels and may use the selected channels for contention. The BS attempts transmission by randomly selecting one pair of channels among the pairs of unused BBCs/BICs using the collected information about the BBC/BIC.

Each BS may transmit any selected number (or symbol) information to an MS through the BBC. Information used to determine BS winning contention, transmitted by the each BS, is not limited to number information. MS can select BS winning contention using any type of information transmitted by each BS according to predefined rule. Hereinafter, the present invention will be described that each BS transmit number information among any type of information to MS.

During the transmission of the number information, the BS may collide with other BSs in the BBC. Then the MS may inform all colliding BSs of collision information (e.g., a colliding channel number) of the BBC through the BIC or the random access channel. If the BIC is comprised of a plurality of channels, the MS may inform the BSs of the BBC collision information through a specific BIC among the plurality of BICs. The random access channel is a channel shared by all BSs. The MS may report the BBC collision information in the BBC using the random access channel. Unlike the BBC, the BIC may perform signaling to the BS only with a size of one bit. The acquisition of a pair of BBC/BIC by the BS is initially implemented once, and if collision occurs, the acquisition process is repeated.

If collision occurs, each BS may randomly select one pair of BBC/BIC to attempt transmission. Such a process may continue until acquiring BBC/BIC with no collision is obtained. Each BS acquiring a pair of BBC/BIC may select an number (or symbol) and transmit the selected number (or symbol) to the MS through the acquired BBC. Here, the number may be any number or priority may be given thereto considering fairness between BSs.

An MS in a system may receive the number information transmitted from respective BSs through the BBC. The MS may discriminate between winner BSs and loser BSs by receiving the number information transmitted from the BSs. In this case, it is assumed that the MS judges a BS which transmits the smallest number to be a winner of contention.

If the MS decodes only one number through the BBC channel, this means that only one BS tries to perform transmission without any contending between BSs. Hence, the MS carries out no operation. Meanwhile, if the MS decodes two or more numbers through the BBC channel, since this means that BSs adjacent to the MS contend with one another, the MS may judge one BS, which transmits the smallest number, among the contending BSs to be a winner of contention. The MS may then transmit a signal indicating a loser contention to the other BSs through the BIC. However, it may be assumed, unlike the above assumption, that the MS judges a BS which transmits the largest number to be a winner of contention.

A BS winning contention may transmit data to an MS using a DL data transmission region and receive data from the MS using a UL data reception region in a next time unit (e.g, subframe). Meanwhile, a BS or BSs losing contention may not transmit and receive data to and from an MS in a next time unit (e.g, subframe).

Figure 4:
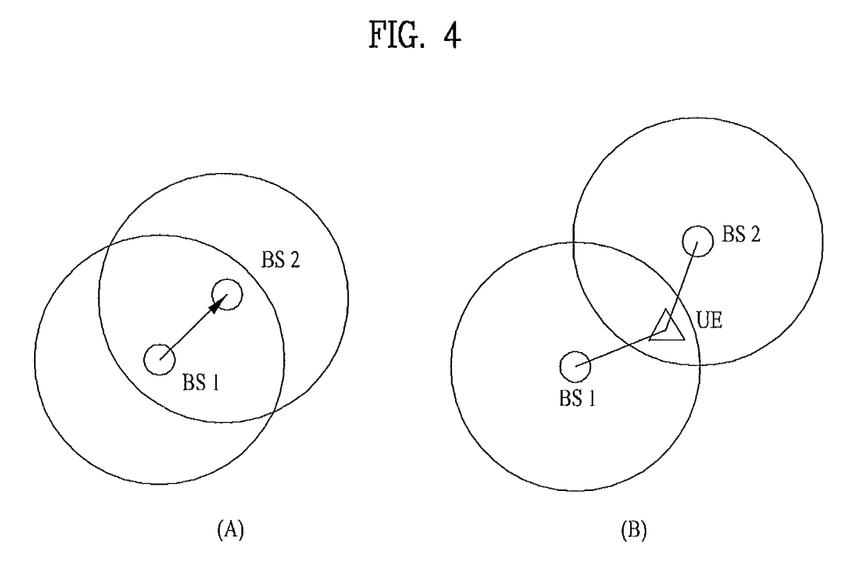
FIG. 4 is a view explaining the concept of neighbor BSs according to the present invention.

FIG. 4 is a view explaining the concept of neighbor BSs according to the present invention.

Referring to FIG. 4, respective BSs (BS1 and BS2) may perform communication in areas shared thereby. In the present invention, if MS is located at a shared area between BSs, the BSs thereby are referred to as neighbor BSs. However, if MS is not located at a shared area between BSs, the BSs thereby are not referred to as neighbor BSs. Accordingly, two BSs illustrated in FIG. 4(A) do not correspond to neighbor BSs and two BSs illustrated in FIG. 4(B) correspond to neighbor BSs.

Figure 5:
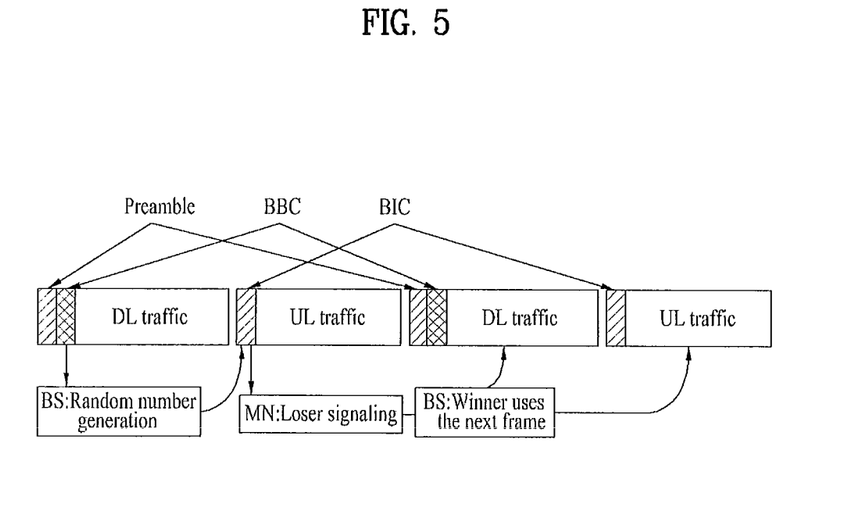
FIG. 5 illustrates allocation of a frame using contention of a pair of BBC/BIC according to an exemplary embodiment of the present invention.

FIG. 5 illustrates allocation of a frame using contention of a pair of BBC/BIC according to an exemplary embodiment of the present invention.

Referring to FIG. 5, BSs may use the same channel access scheme for DL traffic and UL traffic. Neighbor BSs need to contend with one another for channel access. A BS which acquires the right of transmission through contention in an i-th subframe may exclusively use the next (i+1)-th subframe. Namely, only a BS which wins contention in an i-th subframe can transmit data to an MS through a DL data transmission region in an (i+1)-th subframe and receive data from an MS through a UL data reception region in the (i+1)-th subframe. BSs continue to contend with one another through a BBC in the (i+1)-th subframe. In other words, the contention of BSs may occur periodically, and a contention period may be a subframe, plural subframes, slot, or a frame unit, etc.

A contention method of neighbor BSs through the BBC will now be described in detail.

Neighbor BSs may select any numbers and transmit the selected numbers to an MS through the BBC. The MS may determine a BS winning contention by transmitting the smallest number based on the number information received from the neighbor BSs. If the BS winning contention is determined, the MS may inform BSs losing contention of a contention result through a BIC corresponding to the received BBC. The MS may transmit a response of a contention result only to the BSs losing contention through the BIC. Since the BIC response may be only signaling for the contention result, collision does not occur when a plurality of MSs responds to the contention result through the BIC.

Figure 6:
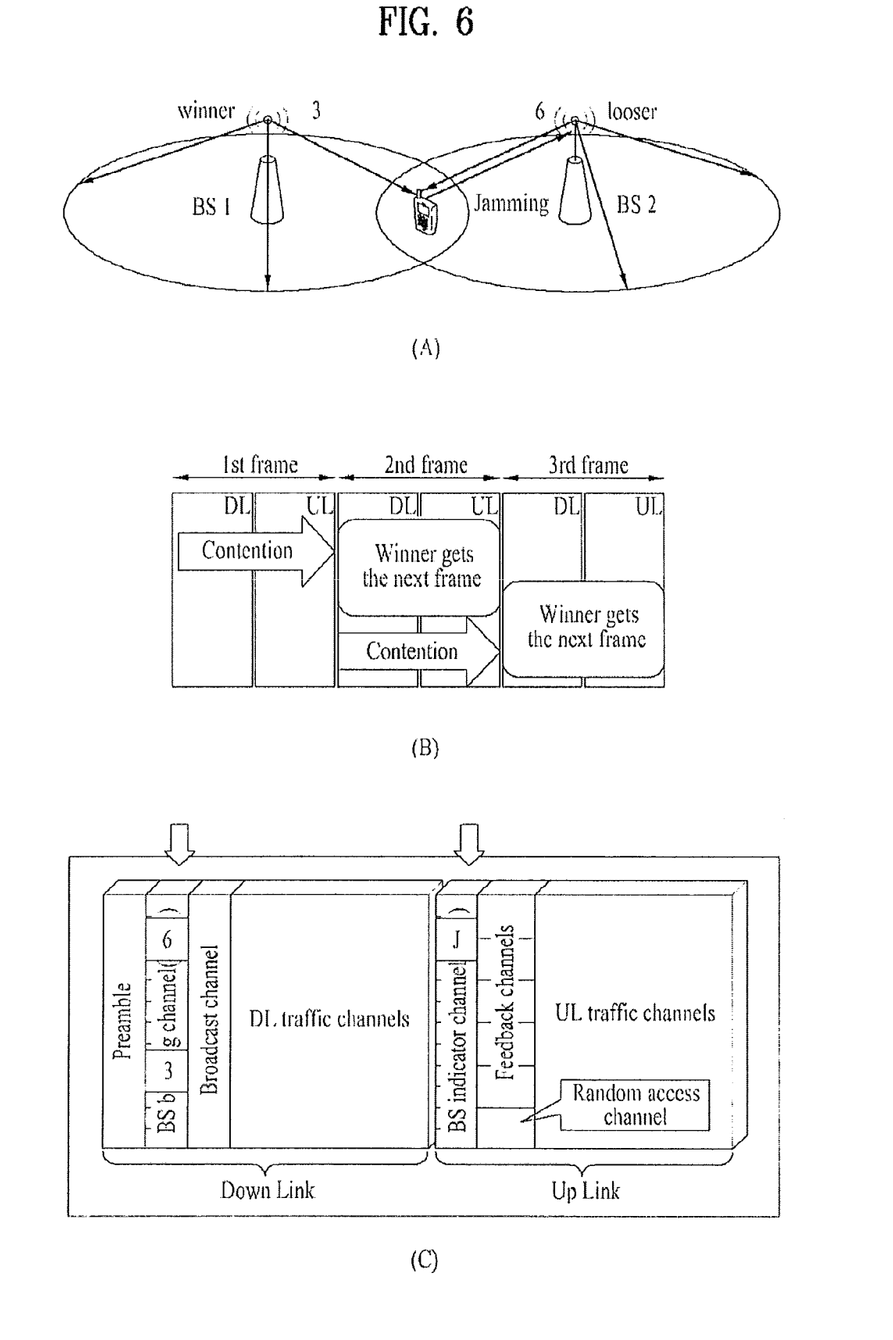
FIG. 6 illustrates a scenario explaining a contention-based distributed BS scheduling scheme according to an exemplary embodiment of the present invention.

FIG. 6 illustrates a scenario explaining a contention-based distributed BS scheduling scheme according to an exemplary embodiment of the present invention.

Referring to FIG. 6, two BSs contend with each other to acquire the opportunity of transmission and reception. As illustrated in FIG. 6(A) to 6(C), a first BS BS1 and a second BS BS2 select numbers '3' and '6', respectively, and transmit the numbers '3' and '6' to an MS through a BBC. Here, number information transmitted by the BS1 and BS2 may be discriminated by frequency regions within the BBC or may be discriminated by differently setting a code such as a pseudo noise (PN) code in a CDMA system within the BBC.

The MS may determine a winner BS by decoding the number information received from the two BSs. The first BS BS1 is determined as a winner BS and the second BS BS2 is determined as a loser BS because the first BS BS1 has transmitted a smaller number. The MS may then inform the second BS BS2 of dropping out of contention.

As illustrated in FIG. 6(B), BSs BS1 and BS2 contend with each other to ensure the opportunity of transmission and reception through a BBC in a first subframe. The winner BS BS1 exclusively uses DL and UL of a second subframe to transmit and receive data to and from the MS. The two BSs continue to contend with each other to ensure the opportunity of transmission and reception through a BBC/BIC in the second subframe as in the first subframe. One BS winning contention in the second subframe exclusively uses DL and UL of a third subframe to transmit and receive data to and from the MS.

Figure 7:
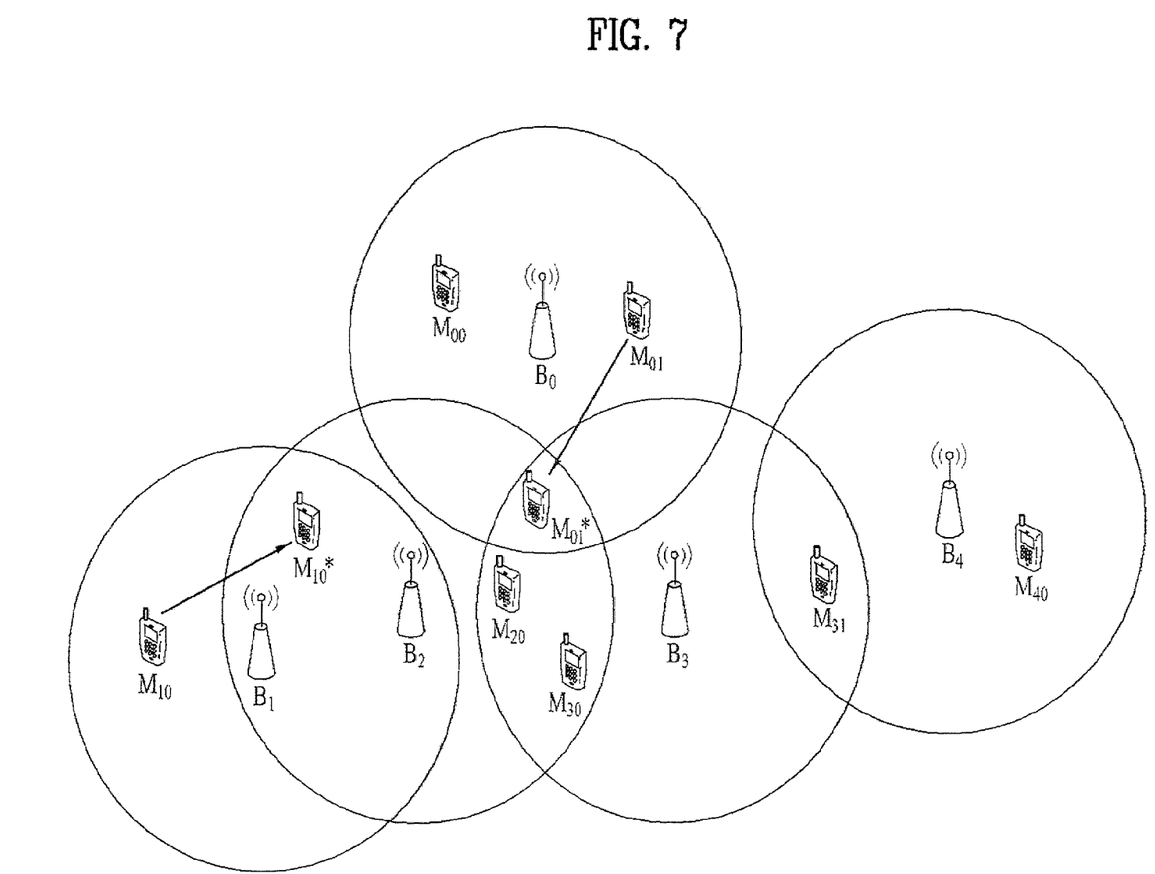
FIG. 7 illustrates a topology explaining an operation of a contention-based distributed BS scheduling scheme according to an exemplary embodiment of the present invention.

FIG. 7 illustrates a topology explaining an operation of a contention-based distributed BS scheduling scheme according to an exemplary embodiment of the present invention.

Referring to FIG. 7, 5 BSs are located at a short distance therebetween and each BS has one or two MSs. Reference symbols and 'M' and 'B' denote an MS and a BS, respectively. MSs $M_{01}$ and $M_{10}$ are located in areas which are not shared by BSs. Therefore, BSs $B_0$ and $B_1$ do not experience interference from a BS $B_2$ although the BS $B_2$ is within areas of the BSs $B_0$ and $B_1$. However, if the MS $M_{10}$ moves to a location of $M_{10}*$, the BSs $B_1$ and $B_2$ become neighbor BSs. Similarly, if the MS $MS_{01}$ moves to a location of $M_{01}*$, the BSs $B_0$, $B_2$, and $B_3$ become neighbor BSs.

In this case, it is assumed that a network system is started before the MSs $M_{01}$ and $M_{10}$ move. It is also assumed that the total number Nch of pairs of BBCs/BICs is 10. When the network is started, each BS randomly selects one pair of BBC/BIC. It is assumed that the BSs $B_0$ to $B_4$ select BBC/BIC pair numbers ($c_i$) 2, 4, 4, 5, and 5, respectively and select contention numbers ($r_i$) in a contention window W. It is assumed that the contention window W is 16 and the BSs $B_0$ to $B_4$ select contention numbers 5, 12, 6, 10, and 12, respectively. Such a scenario is shown in the following Table 1.

In a first subframe, each BS may transmit any number through a randomly selected BBC subchannel. Since the BSs $B_1$ and $B_2$ do not currently share an MS, collision does not occur in the BBC subchannel. The BSs $B_1$ and $B_2$ do not need to contend with each other because they are not neighbor BSs. Therefore, the BS $B_1$ may serve the MS $M_{10}$ without interference from the BS $B_2$, and the BS $B_2$ may serve an MS $M_{20}$ without interference from the BS $B_1$.

However, since the BSs $B_3$ and $B_4$ share an MS $M_{31}$, the BS $B_4$ may cause interference when communicating with the BS $B_3$ and the MS $M_{31}$. Accordingly, it is desirable that the BSs $B_3$ and $B_4$ contend with each other to avoid simultaneous operation. If the BSs $B_3$ and $B_4$ select the same channel by chance, the MS $M_{31}$ cannot decode any numbers transmitted from the BSs $B_3$ and $B_4$. The MS $M_{31}$ may inform the BSs $B_3$ and $B_4$ that collision occurs in a BBC number 5 through a random access channel, etc. They may change the pair of BBC/BIC to other idle channels if they receive a message that the collision occurs in the channel number 5.

MSs $M_{20}$ and $M_{30}$ are located in an area shared by the BSs $B_2$ and $B_3$. Since the BSs $B_2$ and $B_3$ select different BBC/BIC pairs, the MSs can decode any numbers transmitted through the BBC. Moreover, since the BS $B_3$ transmits a number larger than a number transmitted by the BS $B_2$ by 4, the MSs $M_{20}$ and $M_{30}$ may inform the $B_3$ of dropping out of contention. As a result, the BSs $B_0$, $B_1$, and $B_3$ may be activated in a second subframe. Information about the activated BSs is listed below in Table 1.

In a last part in which the first subframe is transmitted, if the MS $M_{10}$ moves to the location of $M_{10}$*, the BSs $B_1$ and $B_2$ become neighbor BSs. As shown in Table 1, the BSs $B_1$ and $B_2$ collide with each other in a BBC subchannel number 4. If the MS $M_{10}$ informs the BS $B_1$ and $B_2$ of the occurrence of collision, the BSs $B_1$ and $B_2$ may change BBC subchannels for next contention. The BS $B_3$ winning contention may exclusively use the next subframe.

After the second subframe, the MS $M_{01}$ may move to the location of $M_{01}$*. Then the BSs $B_0$, $B_2$, and $B_3$ become neighbor BSs. In a third subframe, the BS $B_3$ is a winner BS among the three BSs and therefore, the MS $M_{01}$ may inform the BSs $B_0$ and $B_2$ of dropping out of contention through a corresponding BIC subchannel. However, if the BS $B_3$ loses contention with the BS $B_4$, the BS $B_3$ may receive a signal indicating dropping out of contention from the MS $M_{31}$. Although the BSs $B_3$ and $B_4$ transmit the same number, a BS corresponding to a smaller channel number wins contention according to a rule for the case where the same number is transmitted.

A fourth frame shows the worst example. Even though there are no two BSs using the same BBC/BIC pair, only one BS can be activated in the next subframe. To reduce such a probability, a multiple-round contention mechanism may need to be used. The scheduling scheme described up to now relates to a method in which a BS, which wins contention once, uses the next subframe exclusively and transmits a signal.

TABLE 1

Frame 1

| | BBC | | | | Event |
|---|---|---|---|---|---|
| BS id | Sub-channel# | Ran-dom# | BIC signaling | RACH | between Frame 1 & 2 |
| 0 | 2 | 5 | | | $M_{10}$ moves |
| 1 | 4 | 12 | | | to $M_{10}$*: |
| 2 | 4 | 6 | | | $B_1$ and |
| 3 | 5 | 10 | $M_{20}$, $M_{30}$ | $M_{31}$ | $B_2$ become |
| 4 | 5 | 2 | | $M_{31}$ | neighbors. |

Frame 2

| | BBC | | | | Event |
|---|---|---|---|---|---|
| BS id | Sub-channel# | Ran-dom# | BIC signaling | RACH | between Frame 2 & 3 |
| ✓0 | 2 | 3 | | | $M_{01}$ moves to |
| ✓1 | 4 | 1 | | $M_{10}$ | $M_{01}$*: |
| ✓2 | 4 | 11 | $M_{20}$, $M_{30}$ | $M_{10}$ | $B_0$, $B_2$ and |
| 3 | 3 | 7 | | | $B_3$ become |
| 4 | 8 | 14 | $M_{31}$ | | neighbors. |

TABLE 1-continued

Frame 3

| | BBC | | | | Event |
|---|---|---|---|---|---|
| BS id | Sub-channel# | Ran-dom# | BIC signaling | RACH | between Frame 3 & 4 |
| ✓0 | 2 | 10 | $M_{01}$ | | |
| 1 | 5 | 7 | | | |
| 2 | 7 | 4 | $M_{01}$, $M_{20}$, $M_{30}$ | | |
| ✓3 | 3 | 1 | $M_{31}$ | | |
| 4 | 8 | 1 | | | |

Frame 4

| | BBC | | | | Event |
|---|---|---|---|---|---|
| BS id | Sub-channel# | Ran-dom# | BIC signaling | RACH | between Frame 4 & 5 |
| 0 | 2 | 5 | $M_{01}$ | | Only one |
| ✓1 | 5 | 1 | | | node is |
| 2 | 7 | 2 | $M_{10}$ | | activated in |
| 3 | 3 | 4 | $M_{01}$, $M_{20}$, $M_{30}$ | | spite of no |
| ✓4 | 8 | 6 | $M_{31}$ | | collision. |

Frame 5

| | BBC | | | | Event |
|---|---|---|---|---|---|
| BS id | Sub-channel# | Ran-dom# | BIC signaling | RACH | between Frame 5 & 6 |
| 0 | 2 | 3 | | | |
| ✓1 | 5 | 5 | | | |
| 2 | 7 | 10 | $M_{01}$, $M_{10}$, $M_{20}$, $M_{30}$ | | |
| 3 | 3 | 8 | $M_{01}$, $M_{31}$ | | |
| 4 | 8 | 5 | | | |

The present invention may be extended to a subframe allocation scheme in which one of neighbor BSs can exclusively transmit a signal through plural (n) contentions (i.e., contentions from an i-th subframe to an (i+n−1)-th subframe). Namely, a BS obtaining the opportunity of transmission to an MS through the plural number of contentions, may transmit a signal in plural (n) subsequent frames (from an (i+n)-th subframe to an (i+2n−1)-th subframe). Allocation of a subframe resource through plural contentions can be helpful to improve channel utilization. In other words, a new contention is performed between BSs which lose one contention, thereby improving channel utilization. A BS winning one contention can prevent the opportunity of transmission from being lost in a following contention by transmitting a smaller number than a minimum number by one in a next contention through a BBC. A BS winning plural (n) contentions transmits a signal during plural (n) subframes.

Hereinafter, an N-round contention mechanism is described. N subframes may be combined into one frame. A first round may be comprised of one subframe. In a wireless communication system, plural pairs of neighbor BSs may contend with one another to transmit data to an MS. After N-round contention, a BS winning contention may transmit and receive data to and from the MS using a DL data transmission region and a UL data reception region, in N subsequent subframes. For example, a BS winning a first round contention may select a number such as '−1' for a next subframe. Namely, the BS winning the first round contention selects the number '−1' in a second round to an N-th round and transmits the number to the MS, thereby winning N contentions. Accordingly, the BS winning the N contentions may transmit and receive data to and from the MS through N subsequent subframes. Meanwhile, more opportunities to win contention may be given to BSs losing at contention. A BS winning a second round contention among neighbor BSs may select a number such as '−1' for a next subframe. Then, the BS winning the second round contention selects the number '−1' in a third round to an N-th round and transmits the number to the MS. Accordingly, the BS winning the N−1 contentions may transmit and receive data to and from the MS using a DL data transmission region and a UL data transmission region, through N subsequent subframes. As described above, BS wining once contention among the N contentions may transmit data to MS through N subsequent subframes. Meanwhile, BS wining last N-th round among the N round contentions may transmit data to MS through N subsequent subframes.

Figure 8:
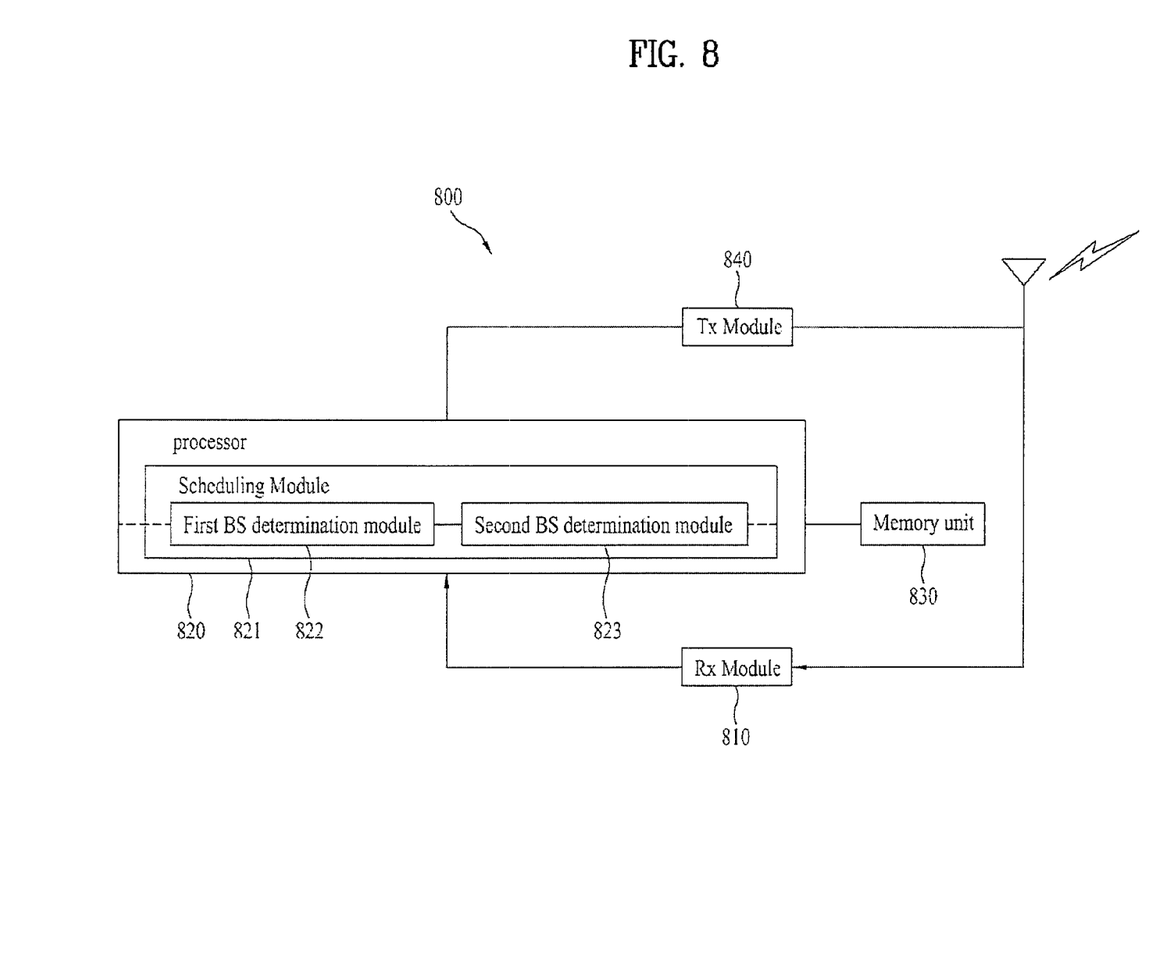
FIG. 8 is a block diagram illustrating the configuration of an MS apparatus for performing scheduling according to an exemplary embodiment of the present invention.

FIG. 8 is a block diagram illustrating the configuration of an MS apparatus for performing scheduling according to an exemplary embodiment of the present invention.

Referring to FIG. 8, the MS apparatus includes a reception (Rx) module 810, a processor 820, a memory unit 830, and a transmission (Tx) module 840.

The Rx module 810 may receive all DL signals from BSs. The Rx module 810 may receive any number information through a specific DL channel from each of neighbor BSs in a first time unit (e.g., a subframe, a slot, two or more subframes, or two or more slots). In addition, the Rx module 810 may receive any number information through the specific DL channel in N time units from each of neighbor BSs.

The processor 820 may include a scheduling module 821. The scheduling module 821 may include a first BS determination module 822 and a second BS determination module 823. The scheduling module 821 may determine, based on number information received in N time units (e.g., N subframes or N slots), a BS to transmit data using a DL data transmission region and to receive data using a UL data reception region, in the next N time units subsequent to the N time units. The first BS determination module 822 may determine a first BS to transmit data using a DL data transmission region and to receive data using a UL data reception region, in next N time units subsequent to the N time units based on at least one of number information received in M time units (where M≤N). The second BS determination module 823 may determine a second BS to transmit data using a DL data transmission region and to receive data using a UL data reception region, in the next N time units subsequent to the N time units based on at least one of number information received in (N−M) time units after the first BS is determined.

The memory unit 830 may store various information such as any number information received from the BS for a predetermined time period.

The Tx module 840 may transmit a signal indicating that data transmission using a DL data transmission region in a second time unit (e.g., a subframe, a slot, two or more subframes, or two or more slots) is not possible, to the other BSs excluding the determined BSs among the neighbor BSs. The Tx module 840 may further transmit a collision indicator indicating that number information transmitted by neighbor BSs collides in a specific DL channel in the first time unit. The collision indicator may be transmitted through a random access channel in the first time unit or a specific UL channel in the first time unit corresponding to the specific DL channel in the first time unit.

Figure 9:
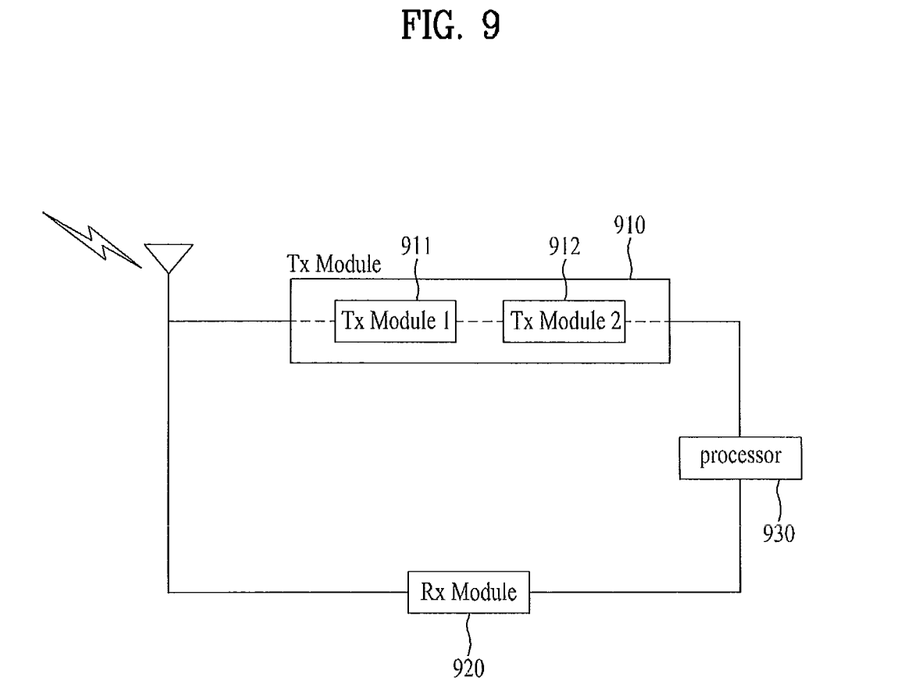
FIG. 9 is a block diagram illustrating the configuration of a BS apparatus for transmitting and receiving data according to an exemplary embodiment of the present invention.

FIG. 9 is a block diagram illustrating the configuration of a BS apparatus for transmitting and receiving data according to an exemplary embodiment of the present invention.

Referring to FIG. 9, the BS apparatus includes a Tx module 910, an Rx module 920, and a processor 930.

The Tx module 910 may include a first Tx module 911 and a second Tx module 912. The first Tx module 911 may transmit any number information selected by a BS to an MS through a specific DL channel in a first time unit (e.g., a subframe, a slot, two or more subframes, or two or more slots). In this case, the number information selected by the BS may be discriminated by a frequency region or a code in the specific DL channel of the first time unit.

The Rx module 920 may receive all UL signals from MSs. The Rx module 920 may receive a collision indicator indicating that the number information transmitted by the first Tx module 911 collides with number information transmitted by another BS in the specific DL channel in the first time unit. In addition, the Rx module 920 may receive, from the MS, a signal indicating that data transmission using a DL data transmission region in a second time unit is not possible.

If the Rx module 920 does not receive the signal indicating that data transmission using the DL data transmission region in the second time unit (e.g., a subframe, a slot, two or more subframes, or two or more slots) is not possible, the second Tx module 912 may transmit data using a DL data transmission region and receive data using a UL data reception region in the second time unit. The Rx module 920 may receive, from the MS, a signal, which indicates that data transmission and reception using the DL data transmission region and the UL data reception region in the second time unit is not possible, through a specific UL channel in the first time unit corresponding to the specific DL channel of the first time unit.

In the present invention, a new frame structure for a highly interfered network such as a femtocell has been proposed. The new frame structure can reduce interference and can effectively use wireless channel resources, using a contention-based random access method.

The contention-based distributed BS time scheduling scheme according to the present invention performs efficient interference control through effective distribution of time resources in a state wherein BSs are densely distributed, thereby increasing the overall capacity of a network. When femtocell BSetc. are densely distributed, a method for completely eliminating mutual interference by separating time resources and frequency resources from each other may be more effective than a method for controlling interference through electric power control.

Existing frequency-based interference control method is problematic in terms of extension and may be unusable when BSs are densely arranged without any planning. However, the present invention has an advantage in terms of extension since BSs are distributively operated with help from MSs.

The present invention is superior to a conventional interference control method using power control, in terms of fairness between BSs. Although the conventional interference control method using power control reduces interference between BSs, a BS in which users gather around a cell boundary may experience more severe interference problems than a BS in which users gather around a cell center. However, since the present invention prohibits neighbor BSs creating interference with respect to one BS transmitting a signal from transmitting a signal, interference is fundamentally eliminated. Namely, since BSs can perform transmission without interference irrespective of whether users are at a cell edge or at a cell center, fairness of BSs can be improved.

In summary, the present invention has an advantage in terms of extension since BSs are distributively operated with help from MSs.

The present invention is superior to a conventional interference control method using power control in terms of fairness between BSs.

Since the present invention prohibits neighbor BSs creating interference with respect to one BS transmitting a signal from transmitting a signal, interference is fundamentally eliminated and communication capabilities can be remarkably improved.

The present invention can raise fairness between BSs since BSs can perform transmission without interference irrespective of presence/absence of uses in a cell edge and a cell center.

Effects obtained from the present invention are not limited to those described above and other effects will become apparent to any person of ordinary skill in the art from the foregoing description.

The above-described scheduling method, MS apparatus using the scheduling method, data transmission method, and BS apparatus using the data transmission method in the wireless communication system may be applied to various mobile communication systems such as an IEEE 802.16m system as well as a 3GPP LTE system.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

What is claimed is:

1. A method for scheduling, by a mobile station (MS), data transmission and reception of neighbor base stations (BSs) adjacent to the MS in a wireless communication system, the method comprising:
    receiving, at the MS, number information through a specific downlink channel in first to Nth time units from each of the neighbor BSs, wherein the number information includes a number selected by the each of the neighbor BSs;
    determining, by the MS, among the neighbor BSs, a BS which is to transmit and receive data in first to 2Nth time units according to a predefined rule based on the number information, wherein the determining further comprises:
        determining a first BS which is to transmit and receive data in the first to the Nth time units, based on at least one of number information received during the first to Mth time units, where M<N, M is integer, and N is integer greater than or equal to 2; and
        determining a second BS which is to transmit and receive data in N+1th to 2Nth time units, based on at least one of number information received during M+1th to the Nth time units;
    transmitting, by the MS, a signal, indicating that data transmission and reception in the first to the Nth time units are not possible, to at least one other neighbor BS excluding the determined first BS among the neighbor BSs through a specific uplink channel; and
    transmitting, by the MS, a signal, indicating that data transmission and reception in the N+1th to the 2Nth time units are not possible, to at least one other neighbor BS excluding the determined second BS among the neighbor BSs through the specific uplink channel.

2. The method according to claim 1, wherein the predefined rule is determining a BS which transmits a smallest number as the BS which is exclusively to transmit and receive data in the first to Nth time units or the N+1th to the 2Nth time units by comparing the number information transmitted by the neighbor BSs.

3. The method according to claim 1, further comprising transmitting data to only the determined first BS in the first to the Nth time units.

4. The method according to claim 1, wherein the wireless communication system uses a time division duplex (TDD) or frequency division duplex (FDD) scheme.

5. The method according to claim 1, further comprising transmitting data to only the determined second BS in the N+1th to the 2Nth time units.

6. The method according to claim 5, further comprising receiving data from only the determined first BS in the first to the Nth time units.

7. The method according to claim 1, further comprising receiving data from only the determined second BS in the N+1th to the 2Nth time units.

8. The method according to claim 1, wherein the number information transmitted by the neighbor BSs is discriminated by a frequency region or a code in the specific downlink channel.

9. A mobile station (MS) apparatus for scheduling data transmission and reception of neighbor base stations (BSs) in a wireless communication system, the MS apparatus comprising:
    a reception module configured to receive number information through a specific downlink channel in first to Nth time units from each of the neighbor BSs, wherein the number information includes a number selected by the each of the neighbor BS;
    a scheduling module configured to determine among the neighbor BSs, a BS which exclusively is to transmit and receive data in first to 2Nth time units subsequent to the first frame according to a predefined rule based on the number information, wherein the scheduling module is further configured to:
        determine a first BS which is to transmit and receive data in the first to the Nth time units, based on at least one of number information received during the first to Mth time units, where M<N, M is integer, and N is integer greater than or equal to 2, and
        determine a second BS which is to transmit and receive data in N+1th to 2Nth time units, based on at least one of number information received during M+1th to the Nth time units; and
    a transmission module configured to:
        transmit a signal, indicating that data transmission and reception in the first to the Nth time units are not possible, to at least one other neighbor BS excluding the determined first BS among the neighbor BSs through a specific uplink channel, and
        transmit, a signal, indicating that data transmission and reception in the N+1th to the 2Nth time units are not possible, to at least one other neighbor BS excluding the determined second BS among the neighbor BSs through the specific uplink channel.

10. The MS apparatus according to claim 9, wherein the predefined rule is determining a BS which transmits a smallest number as the BS which is exclusively to transmit and receive data in the first to Nth times or the N+1th to the 2Nth time units by comparing the number information transmitted by the neighbor BSs.

11. The MS apparatus according to claim 9, wherein the transmission module is further configured to transmit data to only the determined first BS in the first to the Nth time units.

12. The MS apparatus according to claim 9, wherein the transmission module is further configured to transmit data to only the determined second BS in the N+1th to the 2Nth time units.

13. The MS apparatus according to claim 9, wherein the reception module is further configured to receive data from only the determined first BS in the first to the Nth time units.

14. The MS apparatus according to claim 9, wherein the reception module is further configured to receive data from only the determined second BS in the N+1th to the 2Nth time units.

* * * * *